United States Patent [19]

Gatten

[11] 4,253,055
[45] Feb. 24, 1981

[54] ADJUSTABLE SWITCHING CURRENT REGULATOR

[75] Inventor: Ronald A. Gatten, Sunnyvale, Calif.

[73] Assignee: American Optical Corporation, Southbridge, Mass.

[21] Appl. No.: 770,956

[22] Filed: Feb. 22, 1977

[51] Int. Cl.$^3$ .............................................. G05F 1/58
[52] U.S. Cl. ..................................... 323/284; 323/285
[58] Field of Search ................. 323/4, 9, 17, DIG. 1; 361/18, 91; 363/124

[56] References Cited

U.S. PATENT DOCUMENTS

| | | | |
|---|---|---|---|
| 3,383,584 | 5/1968 | Atherton | 323/4 |
| 3,591,830 | 7/1971 | Woolsey | 323/DIG. 1 |
| 3,622,864 | 11/1971 | Claps et al. | 323/4 |
| 3,702,434 | 11/1972 | Ryan | 323/9 X |
| 3,742,330 | 6/1973 | Hodges et al. | 323/DIG. 1 |
| 3,767,998 | 10/1973 | Beling | 323/4 X |
| 3,848,179 | 11/1974 | Kayama | 361/91 X |
| 3,913,002 | 10/1975 | Steigerwald et al. | 323/DIG. 1 |
| 3,931,566 | 1/1976 | Pask et al. | 323/DIG. 1 |
| 3,942,096 | 3/1976 | Itoh et al. | 361/18 X |
| 3,969,652 | 7/1976 | Herzog | 323/DIG. 1 |

Primary Examiner—A. D. Pellinen
Attorney, Agent, or Firm—Jeremiah J. Duggan; Alan H. Spencer

[57] ABSTRACT

A high efficiency current regulator control circuit used to adjust and accurately control current flow in a substantially resistive load such as the low resistance filament in an electron gun of an electron microscope. The efficiency is obtained by running a solid state device such as a transistor in a switching mode. The present circuit represents an advantage over previous circuits which utilized a series or shunt pass regulator which dissipates power in performing the regulation function. The present circuit utilizes a switching mode regulator which regulates by switching a fast transistor either full "on" or full "off" in response to current flow through a sensing resistor. The ratio of "on" to "off" time determines the current transfer. It is a requirement of the circuit that the sensing resistor be of a material having an extremely low temperature coefficient such that the current flow through the resistive element and the resulting inherent heating of the element do not substantially affect its resistive characteristics.

4 Claims, 3 Drawing Figures

ADJUSTABLE SWITCHING CURRENT REGULATOR

BACKGROUND OF THE INVENTION

Certain electronic devices require regulated inputs, either regulated voltage or regulated current, to insure they are stable and provide proper operation. Prior to the advent of the "switching regulator", the common circuits utilized were dissipative in character, being either a series or a shunt regulator in which the dissipation of power in the series or shunt element was utilized to regulate the voltage or the current supplied to that load. As may be recognized, these regulators often include power regulating transistors and function in a continuous mode thereby dissipating very large amounts of power at high load currents, especially when the input-output voltage differential is large.

The switching regulator which is utilized in the present invention has a high efficiency under virtually all input-output conditions. Furthermore, since the power transistor acting as a switch is always either in the fully cutoff or fully saturated state, the switching regulator can achieve very good regulation despite large changes in input voltage or current and thereby maintain a high efficiency over wide range of load current. Because the switching regulator circuit regulates by varying the duty cycle of the transistor switch, the switching frequency should be made very much higher than the line frequency. By doing this, the circuit elements used in the power supply may be generally small, light-weight low cost devices with relatively small power requirements. Further, because of the utilization of these components, it may be possible to drive the switching regulator with a substantially un-filtered DC, further eliminating expensive filtering elements utilized in the prior art devices.

While switching regulators have been known in the recent past, their applications have been as a voltage regulator. In these applications, a power source is connected to the switching transistor which is, in turn, in series with the load the voltage to which is to be regulated. In parallel with the load in the switching transistors, there commonly is a filter including a catch diode to provide a circulating current. The time constant of the FILTER CKT determines the base frequency at which the transistor switches. This type of voltage regulator is now beginning to find wide usage in electronic applications particularly where previous regulator devices generated large power dissipation and the application required means to dissipate the heat generated in such devices. Prior to the present invention, however, switching regulators have not been utilized in a current regulating capacity and it is here that such devices may find an extremely important application. It should be recognized that the switching voltage regulator still utilizes power dissipation in the load as a mechanism by which the voltage is regulated and the present current regulator circuit represents a marked departure from past practice. The inclusion of the switching transistor in the present circuit alleviates the need for a separate series or shunt device and the attendant power transformers and other devices including heat-dissipating units.

None of the present applications of switching regulators or the past applications of conventional current regulators known to me suggest themselves to utilization of a switching element, i.e., a switching transistor in a current regulation circuit.

One of the continuing problems of a current regulation circuit is the inherent heating of the sense component as current flows through the component varies. Such induced temperature change, compounded with changing current flow in the usual resistive regulative devices has made current regulation extremely difficult. In the present application, a special sensing resistor is used which exhibits an extremely low temperature coefficient and relatively low resistance at the same time, which device provides little additional impact on the load circuit the current to which must be regulated. It can be appreciated by one skilled in the art that any such low thermal coefficient device will enhance the operation of such a current regulating device. The inclusion of such a low coefficient device in the present current regulator further enhances its characteristic in being an extremely high efficiency regulator.

While those skilled in the art recognize there are special advantages in using a switching device for regulation of voltage, they also recognize there are substantial disadvantages in the utilization of such devices. It must be pointed out that the utilization of a switching element in a current supply source dictates that the current is initially delivered to a load circuit in a succession of "square wave" pulses. These inherently have short rise and fall times and, as may be recognized by those skilled in the art, may be seen to introduce substantial noise components to the load. When one thinks of building a current regulator, one considers the needs of a device wherein current must be regulated, e.g. constant, not a succession of distinct pulses to a high degree. They are invited not to pick noisy devices or such distinctly "pulsing" devices since the objective is to have a smooth, accurately controlled current flow to this load satisfying the demand for the special control selected for its current supply.

These problems, however, are overcome in the present invention by either being eliminated or compensated for. In the present approach, the switching regulator is caused to function over a narrow range of voltage. Further, it is provided with an inductor which operates through a catch diode to give essentially a constant current flow during the intervals when the switching regulator is in the "off" condition. Remarkably, by such inclusion, a relatively quiet device is achieved which provides very high efficiency when compared to state of the art series or shunt devices. In this manner, a widely understood device is chosen to function in a circuit totally contrary to expected utilization and, accordingly provides advantages not known in conventional systems.

These and other advantages in the present invention will be evident upon review of the subsequent description of the preferred embodiments.

SUMMARY OF THE INVENTION

It is, therefore, a primary object of the present invention to provide an improved current regulating circuit for a load wherein the objectives are high efficiency of the control circuit and minimization of dissipation losses.

A more specific object of the invention is to provide a control circuit, for supplying regulated current to a load, which includes a power supply, a switching transistor means connected in series with a power supply and a load, and a low thermal coefficient sensing resistor disposed intermediate the switching transistor and the load. A differential amplifier is connected across the sensing resistor for determining the relative current through the sensing resistor. Comparative means are connected to the output of the differential amplifier and a reference voltage means, the output of which comparative means, is connected to the switching transistor such that it is switched into a conducting state in response to the output of the comparator, at which time the power supply supplies current through the transistor and ultimately to the load. In preferred embodiments of the invention, current additional features such as overload and no-load protection are provided to the circuit. An additional filtering means to provide an ultra-smooth, closely regulated current supply to the load may also be included.

DESCRIPTION OF THE DRAWINGS

Other objects, features, and advantages of the invention, its organization, construction and operation will be best understood from the following detailed description of a preferred embodiment thereof taken in conjunction with the accompanying drawings of which.

DESCRIPTION OF PREFERRED EMBODIMENTS

Figure 1:
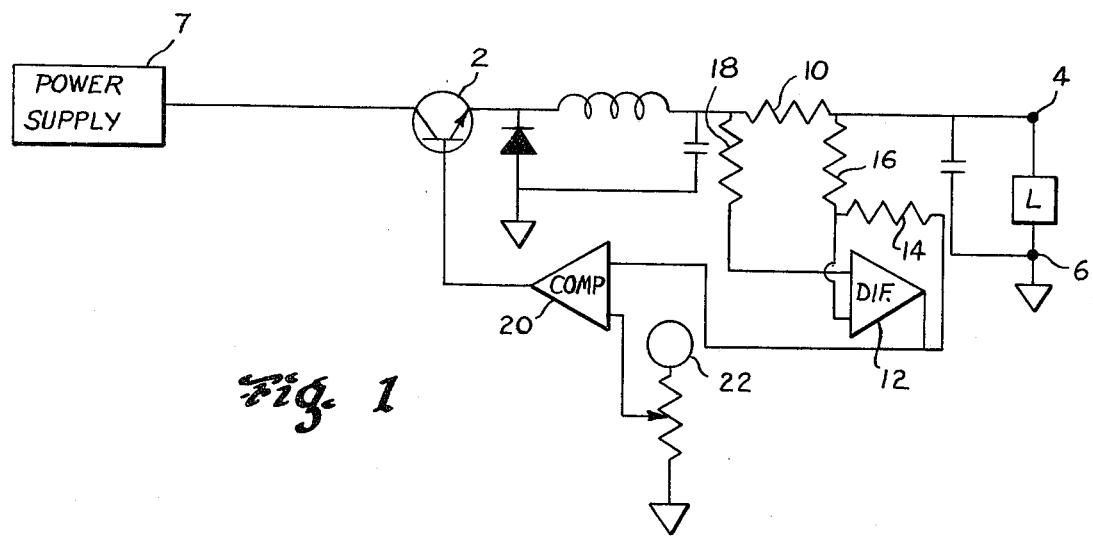
FIG. 1 is a simplified circuit schematic diagram of a current regulator in accordance with the present invention.

Referring now to the drawings, in general and particularly to that of FIG. 1, the present invention is illustrated in a circuit diagram in essentially functional form. In FIG. 1, reference numeral 2 indicates the switching transistor which operates to regulate the current to a load L impressed upon terminals 4 and 6. In the illustrated embodiment, the regulator is shown to be of the "grounded load" type; however, it should be recognized as within the skill of the art to adapt the present invention to a regulator of the type known as a "floating load" current regulator. Transistor 2 is supplied by a power supply 7 which serves as the fundamental current source for load L. On the output side of transistor 2 is the sensing resistor 10 across which a differential amplifier 12 functions. Differential amplifier 12 includes a feedback resistor 14 and additionally input resistors 16 and 18 which, in conjunction with differential amplifier 14, senses the relative current in sensing resistor 10 in the usual fashion. The output of amplifier 12 is supplied to comparator 20. Further input to comparator 20 is a reference voltage from a supply indicated at 22 such that the output of amplifier 12, indicative of the relative current flowing through the circuit and to load L, may be compared against a desired value as represented from a reference voltage source 22. In that function, comparator 20 may then output to switching transistor 2 in response to the difference between the desired current and indicated actual relative current to cause the switching transistor 2 to assume either the full "on" or full "off" state.

A specific illustration of the detailed embodiment of a current regulating circuit of this type will be described subsequently. It will be further appreciated that the current regulating circuit illustrated is of the series pass type in which substantially all of the current passing through the sensing resistor 10 is supplied to the load. This series pass type of circuit has been chosen to illustrate the present invention since one of the principal advantages of the current regulator of the present invention is its high efficiency. It may be recognized by those skilled in the art that in certain special applications, the tradiational shunt pass regulating techniques may be used to advantage. In such device, however, the regulation is accomplished by shunting the undesired portion of the total supply current to ground and the remaining usable portion is supplied to the load.

Figure 2:
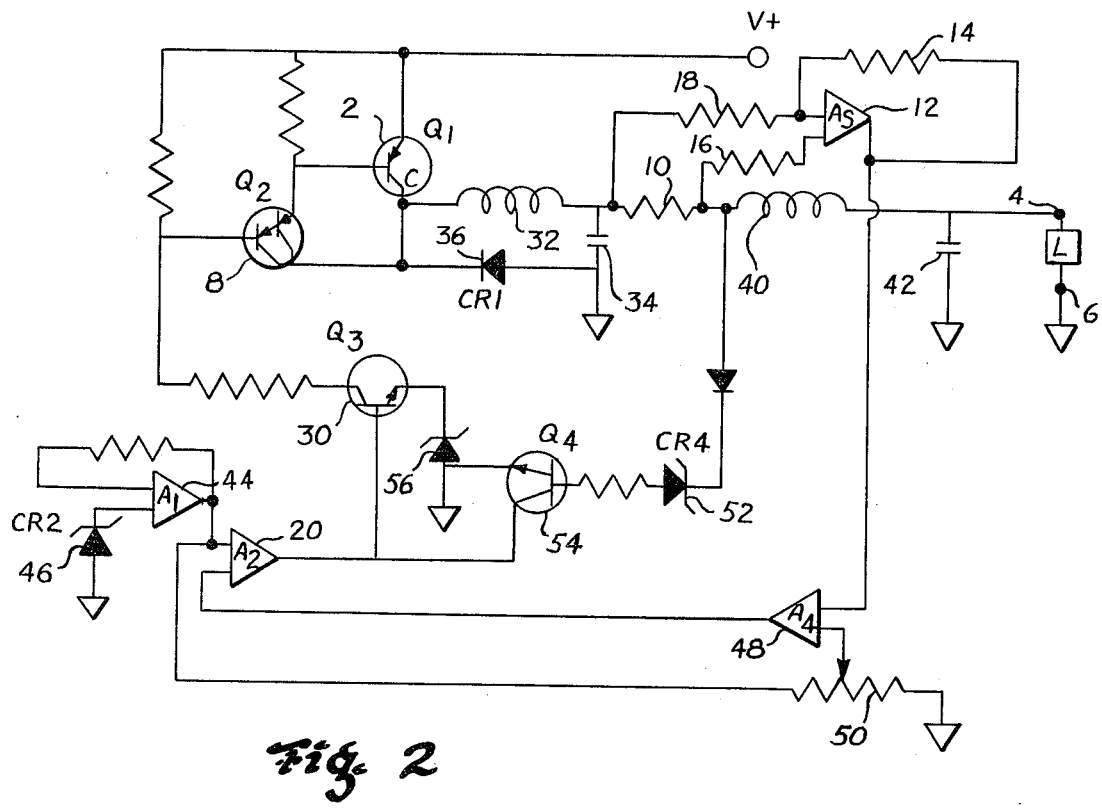
FIG. 2 is a more detailed circuit schematic diagram of a current regulator circuit in accordance with the present invention.

Turning now to FIG. 2, a more detailed embodiment of the present invention is illustrated. In this more detailed illustration, certain additional features are included in the regulatory circuit which are found advantageous in specific applications. Those basic components of the circuit which are illustrated in FIG. 1 appear also in FIG. 2 and include switching transistor 2, output terminals 4 and 6 with load L impressed therebetween, power supply transistor 8, and the sensing resistor 10 with a differential amplifier 12 and the feedback network including resistors 14, 16 and 18. The output of differential amplifier 12 supplied to comparator 20 which, in turn, through other circuit components subsequently to be described, controls switching transistor 2.

In FIG. 2, the main switching transistor 2 (Q-1) is driven by a power transistor 8 (Q-2) which, in turn, is driven by a transistor 30 (Q-3) which is responsive to the output of comparator 20. In its function, switching transistor 2 is switched either full "on" or full "off" such that power dissipation in this switching transistor is at a minimum.

Connected to the output side of the switching transistor 2 is a current filter circuit including inductor 32, capacitor 34, and diode 36. In the present embodiment, when the switching transistor is switched "Off" the diode, a catch diode, 36, supplies power through the inductor 32, and to the load L through sensing resistor 10. By inclusion of catch diode 36, the voltage at the collector C of the switching transistor is prevented from going more than one diode drop negative. Capacitor 34 filters the output power coming out of the inductor such that the load L sees a well regulated smooth current flow.

In the preferred embodiment, sensing resistor 10 is a piece of Manganin wire, being one of a collection of materials having an extremely low temperature coefficient. Other illustrations of materials that are known to be satisfactory are Constantan and a material sold under the trademark, Therlo. These three materials are copper alloys including manganese and such as nickel, aluminum and/or traces of carbon and/or iron and are listed in the HANDBOOK OF CHEMISTRY AND PHYSICS.

In that handbook (Ed. 56, 1975-1976) they are listed as having a temperature coefficient at 20 Centigrade of 0.0001 (pE-84); and a resistivity in micro-ohm centimeters in the range of approximately 40 to 50.

The voltage generated across this resistive Manganin wire sensor resistor 10 supplies an input voltage to the differential amplifier 12 indicating the relative amount of current out of the switching regulator. In the instances where additional filtering of current is desired to provide ultrasmooth current flow to the load L, additional filters in the form of inductive elements 40 and capacitive elements 42 may be included.

As part of the overall sensory control circuit for switching transistor 2, a buffer amplifier 44 is buffered to ground through a low drift Zener diode 46. Additionally, the buffer amplifier supplies a reference voltage to comparator 20 and to a summing amplifier 48. The function of the summing amplifier is to provide current adjustment for the circuit proper such that the value of regulated current to load L may be changed. The variable resistor 50 provides this function in that it adjusts the amount of reference voltage that would be seen on the summing amplifier (A4). Thus, the summing amplifier takes the sense signal from the differential amplifier 12 and sums it with, in the illustrated embodiment, twice the control voltage ($V_o = 2V_{control} - V_{sense}$). This control voltage $V_o$ is then impressed upon comparator 20.

If the observed voltage representing the current flow in sensing resistor 10 is less than the reference voltage from buffer amplifier (A1) 44 then comparator will drive transistor 30 into conduction which, via power transistor 8, drives switching transistor 2 to the "on" condition until the current through sensing resistor 10 is sufficient to cause the calculation in the summing amplifier 48 to indicate that the indicated voltage is equal to the desired voltage. The current flow will then continue and can cause the comparator to sense rising current beyond the desired limit and, in turn, indicate to Q3 this condition and sequence shut down transistor 2. During this shutdown condition, no power is being dissipated in the switching transistor 2 and thus the relative high efficiency of the entire current regulating circuit is promoted.

This circuit contains additional load removal protection as will be described. If load L is disconnected from the output pins 4 and 6, the current regulator naturally tries to maintain the current flow through sensing resistor 10, which causes the voltage to be driven high. In this instance, the illustrated diode 52 being a Zener diode will be caused to conduct. The proper diode with the desired conduction point is selected according to circuit parameters. With the advent of current conduction by Zener diode 52 a "no load" protection transistor 54 may be caused to conduct. In the illustrated embodiment, with the base of trigger transistor 30 connected to the collector of transistor 54 the transistor 30 will be effectively clamped and prevented from functioning, which, in turn, causes transistor 8 to shutdown and cause switching transistor 2 to remain shut down. A Zener diode 56 is included in the emitter of transistor 30 in order to provide further protection in the circuit to insure that the differential amplifier outputs with a sufficiently large positive drive and further to insure shutdown of transistor 8 during the no load conduction situation.

Figure 3:
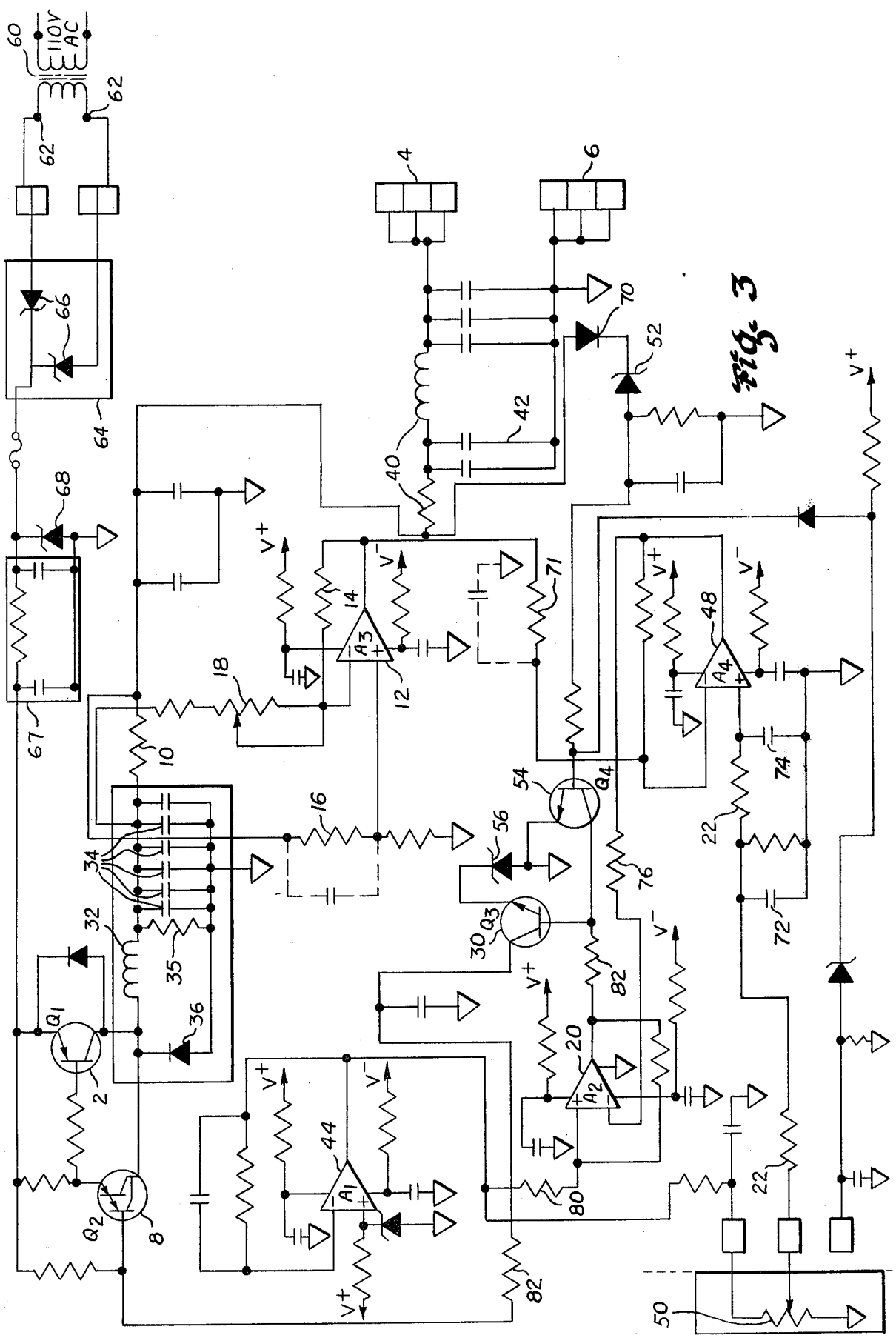
FIG. 3 is a detailed circuit diagram of a specific embodiment of the present invention.

Reference may now be made to FIG. 3 which is a detailed circuit diagram of an actual installation of circuit regulator of the present invention. In the illustrated embodiment, the circuit appears in the control circuitry of an electron microscope such as is illustrated in U.S. Pat. No. 3,678,333 assigned to the Assignee of the present invention.

In FIG. 3, similar numbers are utilized to identify corresponding functional components illustrated in FIGS. 1 and 2. In this embodiment, the control circuit received power from a 110 volt AC source 60 through an isolation transformer, such that, for example, 30 volts AC may be supplied across the output terminals 62 of the isolation transformer. This 30 volt AC is applied to an input rectifier 64, including a Zener diode 66 such as a 1N3042 diode. The output and the input rectifier 64 is suitably fused consistent with good electronics practice and supplied to a filter circuit 67 such that the input supply voltage is low in ripple. In the illustrated embodiment, the filter may include resistive and capacitive components as illustrated.

Further high voltage protection may be provided to the circuit by including a Zener diode 68 such as an SX39 or high voltage protection in the control circuit such as a diode 70 of the type 1N914. The output of the filter circuit thus is supplied to the switching transistor as 30 volts rectified voltage with a suitable heat sync. The switching transistor in this illustration is a 2N4904 or MJ4502 having a diode 1N4003 connected across the collector and emitter for the purpose of protecting the transistor from transients which might feed back from inductor 32. Supplying the switching transistor 2 is power supply transistor such as MJE2090 outputting through the main filter circuit including an inductor 32, a catch diode 36 such as BYX71 with a suitable capacitive and resistive elements such as 2K resistor and the illustrated 1000 micro ohm capacitors. This filter circuit outputs through sensing resistor 10 which in the illustrated embodiment is a piece of Manganin wire having a total resistance of approximately 0.1 ohms. The output of this resistor wire is further supplied to a load attached to output terminal 4 through additional filtering elements 40 and 42. In the illustrated embodiments, the differential amplifier such as an AD510 may be connected to the sensing resistor 10 through input resistor 18 which for trimming purposes may be a variable resistor exhibiting up to approximately 10 or 15 kilohms and thru a second input resistor 16 exhibiting perhaps 10 kilohms. The output of the differential amplifier may be fed back thru a feedback resistor 14 exhibiting as much as approximately 125 kilohms or so. The output of this differential amplifier is supplied to a summing amplifier V48 which may be such as MC1456 with suitable input resistor 71 such as 10 kilohms. Further supplying the summing amplifier 48 is the current adjust feature being a variable voltage input thru a potentiometer 50 suitable resistably coupled and filtered as by components 72 and 74.

The output of summing amplifier 48 is input is thru an input resistor 76 to comparator 20 which may be a CMP01 by Precision Monolithic Company. Comparator 20 is also supplied with its reference voltage from the buffer amplifier 44 which may be such as LM725CH, thru a conventional coupling resistor 80. Comparator 20 is operatively connected to transistor 30 through coupling resistor 82 also connected to a no-load protection transistor 54. Clamping transistor 30 is additionally connected to the shutdown no-load protection transistor 54 through Zener diode 56 which may be a 1N5228. The output of the clamping transistor 30 is supplied through the usual sort of input resistance to the power transistor 8 which, in turn, completes circuit and provides the "on" signal and power drive to power transistor 8 then switching transistor 2.

The illustrated circuit provides output current control in the range of approximately 2 to 4 amps at typical voltage of 3 volts at an estimated efficiency of such as 60 to 90 percent.

It should be recognized from the foregoing description of the advantages and objectives of the current regulating circuit that the invention may be embodied in other specific forms without departing from the spirit or essential characteristics thereof. The present embodiments, therefore, should be considered in all respects as illustrative and not restrictive in the scope of the invention being indicated by the appending claims rather than by the foregoing description.

Those skilled in the art of current regulation will quickly recognize application of circuit to other advantageous usages and find it readily adaptable to the likes of motor control wherein high efficiency regulation is desired. It may be speculated that such application shall occur in the field of motor drives where sources of power are restricted, as exemplified in the emerging technology in the field of electric cars. Further applications will be immediately recognized as advantageous in the space industry wherein power sources are restricted or heat dissipation considerations are preeminent. As in the illustrative inventive current regulation circuit, excessive power is not dissipated during the regulation function as is typical in prior art shunt or series pass active systems. In such shunt or series systems, the regulating member actually dissipates the undesired (surplus) current component either through a transistor amplifier or through a shunt device of one form or another. It should thus be considered that adaptations of the present circuitry to such as the foregoing applications will be recognized within the ultimate spirit and scope of the invention and thus coming within the meaning and range of equivalency of the claimed invention as subsequently drawn.

I claim:

1. A control circuit for supplying regulated current to a load comprising: a power supply, switching transistor means connected in series with said power supply and said load; current sensing resistor means disposed intermediate said switching transistor means and said load; differential amplifier means connected across said sensing resistor for determining the relative current through said resistor; current filtering means disposed intermediate said switching transistor means and said sensing resistor means, said filtering means, including inductor means catch diode means and capacitance means; means for supplying a reference voltage representative of the magnitude or regulated current; comparator means connected to the output of said differential amplifier and said reference voltage means; the output of said comparator being connected to said switching transistor such that it is switched to a conducting state in response to the output of said comparator, whereby the output of said switching transistor is filtered prior to reaching said sensing resistor.

2. A control circuit according to claim 1 wherein said current sensing resistor is of a material which has a temperature coefficient of about 0.001 or less under standard conditions.

3. A control circuit according to claim 1 including "no-load" protection comprising a Zener diode connected intermediate said switching transistor and said comparator means, whereby said comparator output is disabled by reverse conduction of said Zener diode, and said switching transistor is turned "off".

4. A control circuit according to claim 3 including power transistor means to drive said switching transistor; trigger transistor means operably connected to said power transistor, said power transistor being in the conducting mode responsive to conduction of said trigger transistor, clamping transistor means operably connected to the output of said trigger transistor and responsive to said Zener diode whereby said trigger transistor shuts down said power transistor in response to conduction of said Zener diode.

* * * * *